United States Patent [19]

Le Riche et al.

[11] Patent Number: 5,719,901
[45] Date of Patent: Feb. 17, 1998

[54] DATA TRANSMISSION SYSTEM WITH V24 INTERFACES FOR CONTROL OF BI-MODE MODEMS

[75] Inventors: Olivier Le Riche, Noisy Le Roi; Khamphuc Daulasim, Massy, both of France

[73] Assignee: U.S. Philips Corporation, New York, N.Y.

[21] Appl. No.: 612,007

[22] Filed: Mar. 4, 1996

Related U.S. Application Data

[63] Continuation of Ser. No. 12,708, Feb. 3, 1993, abandoned.

[30] Foreign Application Priority Data

Feb. 26, 1992 [FR] France ................... 92 02251

[51] Int. Cl.[6] ...................................... H04B 1/44
[52] U.S. Cl. .................. 375/222; 379/98; 395/831
[58] Field of Search ................ 375/219, 222, 375/368, 369, 220, 221, 354, 356; 340/825.03, 826, 827; 370/352, 357, 359, 360, 386, 391, 419; 379/98, 97; 395/828, 830, 831, 834

[56] References Cited

U.S. PATENT DOCUMENTS

| | | | |
|---|---|---|---|
| 4,419,751 | 12/1983 | Cholat-Namy et al. | 370/13 |
| 4,635,275 | 1/1987 | Borg et al. | 375/222 |
| 4,715,044 | 12/1987 | Gartner | 375/222 |
| 4,864,601 | 9/1989 | Berry | 379/96 |
| 5,202,899 | 4/1993 | Walsh | 375/222 |

FOREIGN PATENT DOCUMENTS

| | | |
|---|---|---|
| 0053212 | 11/1980 | European Pat. Off. |
| 0224149 | 11/1986 | European Pat. Off. |
| 0224149 | 6/1987 | European Pat. Off. |
| 0053212 | 6/1982 | France |

OTHER PUBLICATIONS

D. Behaghel et al., "Compac: The Multiservice Range For Data Switching", published in the journal Commutation & Transmission, No. 1, 1990.
CCITT Recommendation V24.
J.C. Inverinci et al., "New–Generation VLSI Modems", published in the journal Commutation & Transmission, No. 3, 1986.

Primary Examiner—Wellington Chin
Assistant Examiner—William Luther
Attorney, Agent, or Firm—Ernestine C. Bartlett; Leroy Eason

[57] ABSTRACT

A synchronous data transmission system includes modems and data packet switches having interfaces in compliance with CCITT recommendation V24. However, verification of correct operation of the modems is preferably carried out by the system control center by transmission of control instructions which are asynchronous, such as Hayes instructions. To make this possible without requiring additional circuitry, the modems are of the bi-mode type, having a synchronous and an asynchronous mode, and during control of a modem the interface circuits at the relevant packet switch are set to the asynchronous mode. The modem detects that condition of the packet switch interface circuit, and sets its own interface circuits to correspond therewith. The interface circuits are then reset to the synchronous mode after completion of the control operation.

4 Claims, 2 Drawing Sheets 5,719,901

DATA TRANSMISSION SYSTEM WITH V24 INTERFACES FOR CONTROL OF BI-MODE MODEMS

This is continuation of application Ser. No. 08/012,708, filed Feb. 3, 1993, now abandoned.

BACKGROUND OF THE INVENTION

1. Field of the Invention

The present invention relates to a synchronous data transmission system wherein modems connected thereto are controlled by means of interfaces (of the type specifically defined by CCITT V24Recommendation) which comprises a plurality of interface circuits.

The invention likewise relates to a modem suitable for use in such a system.

The invention has application in the fields of data transmission and data switching. In synchronous systems the data is in the form of data packets defined by the CCITT Recommendation X25.

2. Description of the Related Art

Such a system is described in the article entitled "Compac: the Multiservice Range for Data Switching" by D. BEHAGHEL et al., published in the journal "COMMUTATION & TRANSMISSION", No. 1, 1990.

The problem posed with this type of system is its maintenance and, more particularly, the verification of proper operation of the modems or the link made possible by these modems.

It is known that maintenance of the modems can be carried out by sending thereto instructions of the HAYES type, but this takes place in the asynchronous mode.

SUMMARY OF THE INVENTION

The present invention provides a synchronous system of the type defined in the opening paragraph, which permits control or monitoring of the modems with little additional hardware.

The, the system according to the invention is characterized in that:

the modems are of the bi-mode type (synchronous mode and asynchronous mode), and so are suitable to carry out asynchronous control instructions, certain interface circuits are put in a particular state during control of the modems, the modems comprise means for detecting this particular state, and setting to the asynchronous mode to receive and carryout said control instructions.

BRIEF DESCRIPTION OF THE DRAWINGS

The following description, accompanied by the appended drawing Figures, all given by way of non-limiting examples, will make it better understood how the invention can be realized. In the drawings.

DESCRIPTION OF THE PREFERRED EMBODIMENTS

Figure 1:
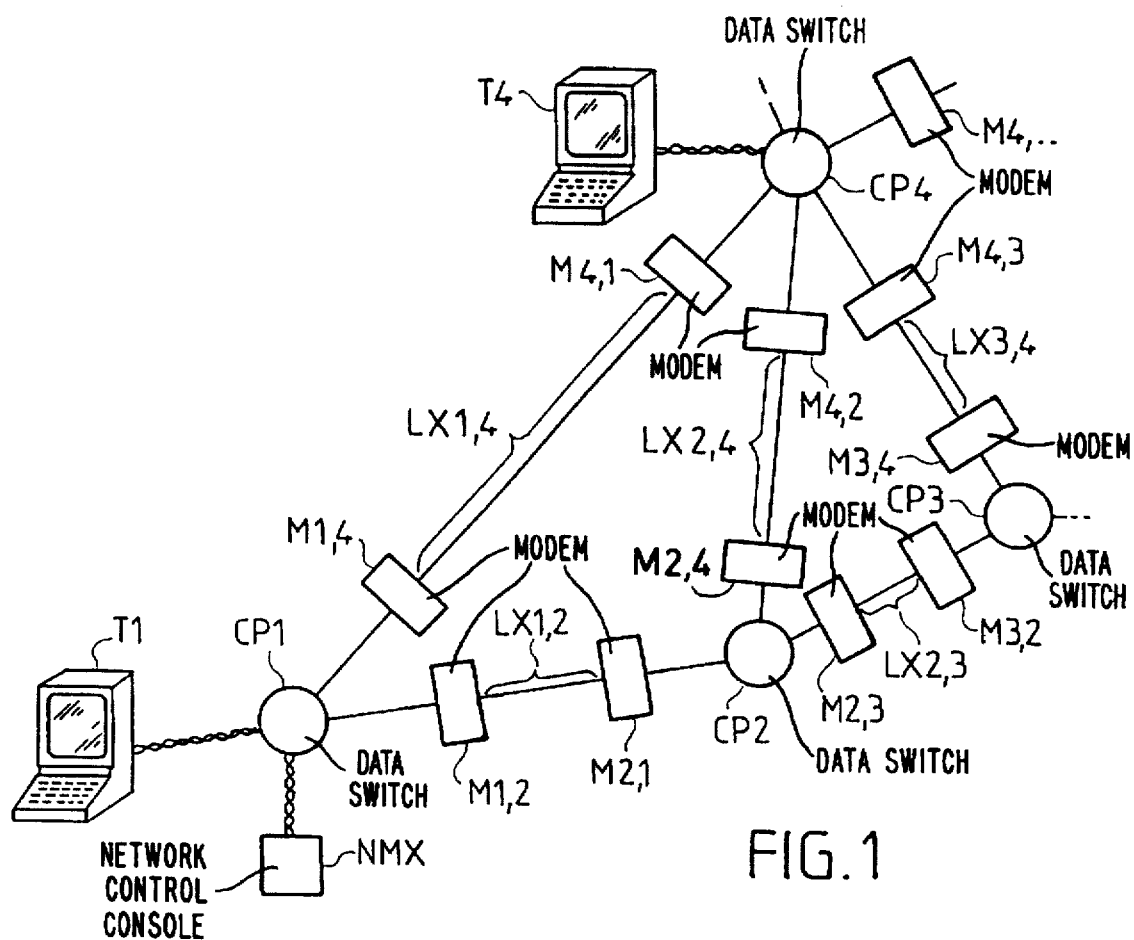
FIG. 1 represents a synchronous system according to the invention.

FIG. 1 shows a data transmission network which comprises, more specifically, four data packet switches CP1, CP2, CP3 and CP4 suitable for switching data transmitted in the form of data packets defined by Standard X25.

To each switch are connected either data terminals or modems, or other apparatus. Thus, in FIG. 1, the data terminal T1, the network control console NMX and the modems M1,2 and M1,4 are connected to the switch CP1. The modems M2,1, M2,3 and M2,4 are connected to the switch CP2, the modems M3,2 and M3,4 are connected to the switch CP3 and the modems M4,1, M4,2, M4,3, M4, . . . as well as the terminal T4, are connected to the switch CP4.

The modems M1,2 and M2,1 are interconnected by a synchronous link of the X25 type referenced LX1,2, the modems M2,3 and M3,2 by a link of the same type referenced LX2,3, the modems M3,4 and M4,3 by a link of the same type referenced LX3,4, the modems M2,4 and M4,2 by a link of the same type referenced LX2,4, the modems M4,1 and M1,4 by a link of the same type referenced LX1,4.

Figure 2:
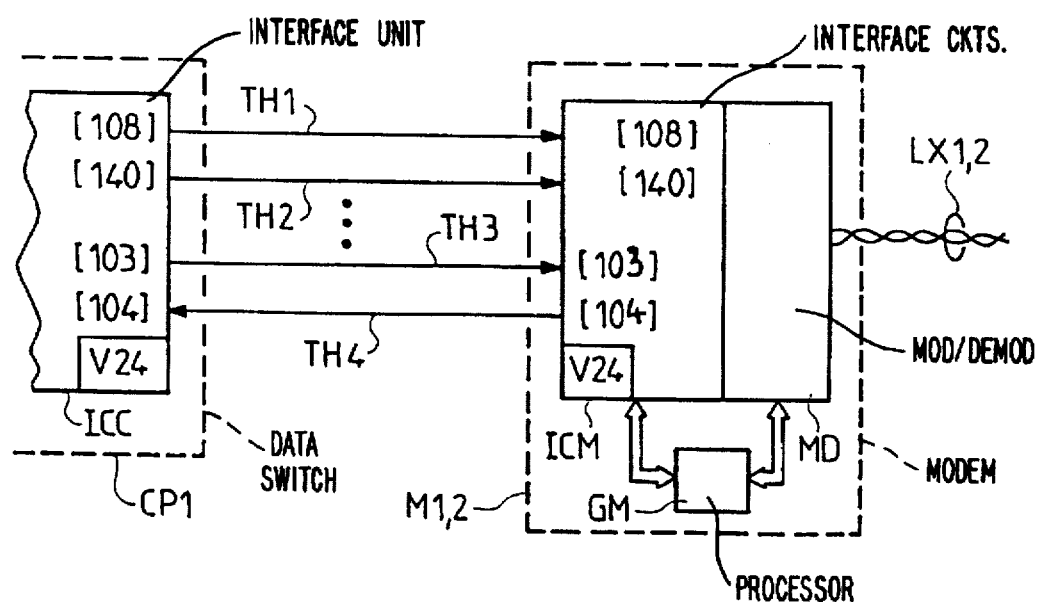
FIG. 2 shows the connection of the modems with the data switch connected to them.

FIG. 2 shows the manner in which the modems are connected to the data switches. In this Figure there is shown how the modem M1,2 is connected to the switch CP1. The link is in accordance with Recommendation V24 of the CCITT. This ink includes the lines essential to the invention, that is to say: TH1, TH2, TH3 and TH4. These various lines connect the interface circuits referenced in conformity with Recommendation V24. It should further be observed that the line TH3 transmits data from the data switch CP1 to the modem M1,2 via the circuit [103], whereas the line TH4 transmits data in the opposite direction using the circuit [104]. The sections MD and GM of the modem represent the rest of the modem. The section MD to which the line LX1,2 is connected comprises, for example, the modulation and demodulation means, whereas the section GM represents an assembly based on a processor which assembly controls the section MD as well as the interface ICM. More details of these modems will be found in the article entitled "Une novelle génération de modems àbase de circuits intégrés a grande èchelle" by J. C. INVERINCI, O. LERICHE et at., published in the journal "COMMUTATION & TRANSMISSION", No. 3, 1986.

Figure 3:
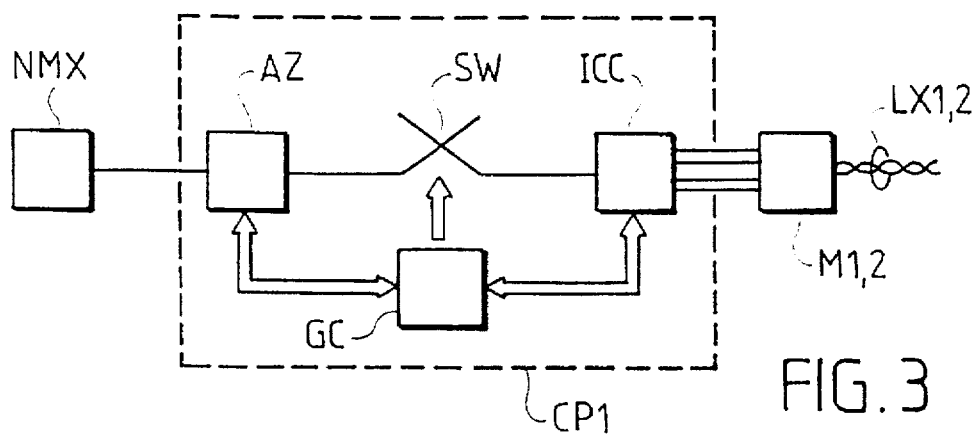
FIG. 3 shows how the control console is connected to the modem via a data switch.

FIG. 3 shows in a diagram a data switch, for example, of the type mentioned before. Especially shown are the elements in the connection established between the control console NMX and the modem M1,2. The analysis part AZ is a block which performs the analysis function on the data coming from the control console. This analysis consists of determining, by means of the control centre GC, the output channel of the switching network SW which forms pan of the switch CP1. The control centre also controls the communication interface ICC of the type V24 connected to the modem M 1,2.

Figure 4:
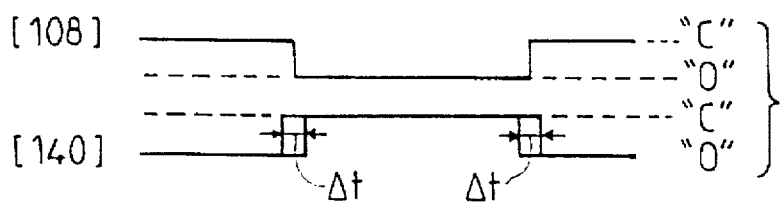
FIG. 4 shows the particular state of two operating circuits, FIG. 5 clarifies the protocol between the control console and the modem, and FIG. 6 clarifies the messages sent by the console for monitoring the control of the modem.

According to the invention (FIG. 4) two circuits of the interface ICC are put in a particular state to set the modem in the asynchronous mode. They are the circuits [108] and [140].

For setting the modem in the asynchronous mode, the signal of the circuit [108] is put in the "0" state (open), whereas the circuit [140] is in the "C" state (closed), practically simultaneously. Nevertheless, there is provided a time tolerance ΔT for approximately of this simultaneity.

The circuit [140] is to be put in the "C" state before the circuit [108] is put in the "0" state.

Figure 5:
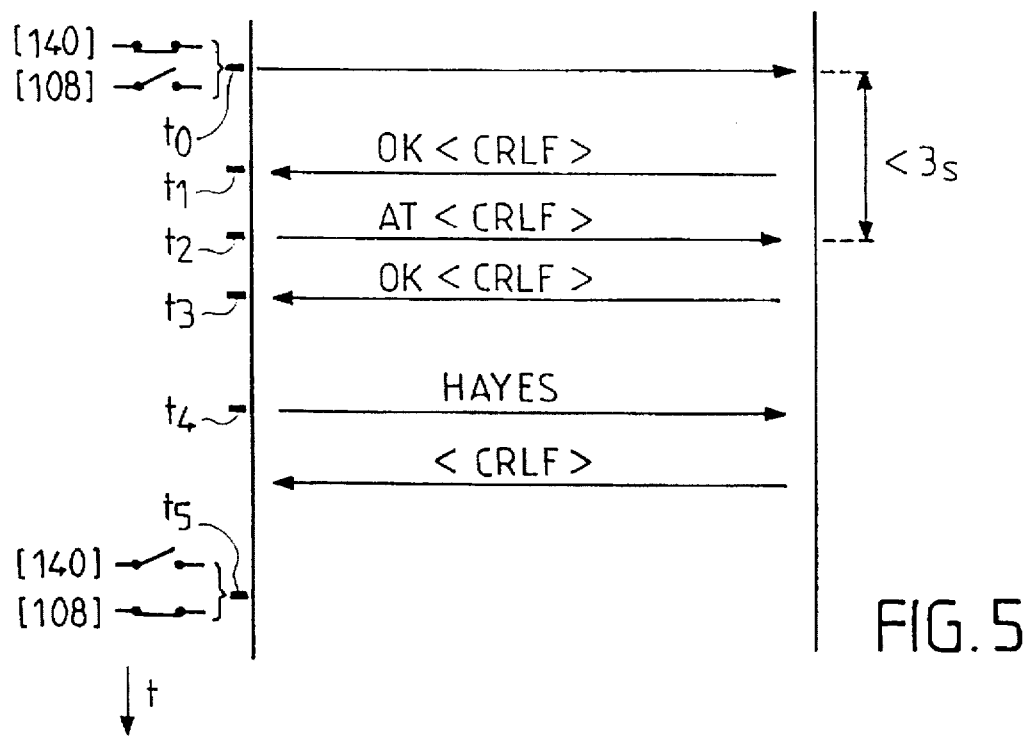

FIG. 5 describes in detail the protocol of the handshake which is effected.

At instant t0 the circuit [140] is put in the closed state and the circuit [108] is put in the open state. This is detected at the modem which then switches to the asynchronous mode and a period of time of 3 seconds starts. An acknowledge receipt signal "OK" is sent by the modem at the instant t1, followed by the carriage return <CRLF> by the circuit [103]. This is sent via the data switch to the control console NMX. From this console a signal AT may be sent at instant t2 which signal is an instruction or the predecessor of a sequence of control instructions, in this case instructions of the HAYES type. This signal AT is sent to the modem which receives same through the circuit [103]. It should be observed that this signal is to occur before the aforementioned period of time of 3 seconds has elapsed. If it occurred after that period of time, the modem would have already returned to its synchronous mode. At the instant t3 the modem acknowledges receipt by sending "OK" once more. Then, at instant t4, the control console can send its instruction of the HAYES type or a sequence of instructions. When the console has sent this sequence, it releases the connection which had been established between itself and the modem. This release detected at the control centre GC causes an instruction to be sent to the interface ICC, causing the circuits [140] and [108] to come back to the open state and closed state respectively.

Figure 6:

FIG. 6 explains the manner in which the circuits [140] and [108] can be put in the various aforementioned states.

When the console NMX sends out a modem control request, it sends in a time slot of the frame X25 an address code ADRCP associated to the modem, a code M denoting that console wishes to carry out maintenance, and a code NBRLINE denoting the number of the line to which the modem is connected.

When the data switch detects its address and the code M, it enables the interface circuit in aforementioned manner.

When the connection is released, the circuits [140] and [108] are put back to the normal state.

It should be observed that the described embodiment of the invention can be used without the need for additional circuit means. At the modem, the monitoring of the circuits is already effected; the processor section GM detects the configuration of the circuits [108] and [140] to ensure operation in accordance with the protocol without additional elements. In like manner, at the data switch, the detection whether the maintenance code signal M is present and whether the NBRLINE code is that of the link corresponding to the switch, enables the centre GC. It then causes the interface ICC to operate the circuits [108] and [140].

What is claimed is:

1. A data transmission system comprising:

a bi-mode modem having a first interface circuit coupled to a synchronous data transmission link and a second interface circuit coupled to an asynchronous transmission link, each of said links having a closed state and an open state and normally being in opposite ones of said states, and first control means for detecting the states of both of said links and selectively switching the modem for operation via the interface circuit which is coupled to the link which is in the closed state;

a data switch having a third interface circuit coupled to said synchronous data transmission link and a fourth interface circuit coupled to said asynchronous data transmission link, and second control means for causing said third and forth interface circuits to normally maintain said synchronous link in the closed state and said asynchronous link in the open state, but to switch said synchronous link to the open state and said asynchronous link to the closed state when asynchronous control instructions are to be transmitted to said modem via said data switch; whereby transmission of asynchronous control instructions to said modem will be via said asynchronous link; and network control means for supplying said asynchronous control instructions to said data switch for transmission to said modem, said second control means causing said third and fourth interface circuits to respectively switch said synchronous link to the closed state and said asynchronous link to the open state after said modem has completed execution of said control instructions.

2. A data transmission system as claimed in claim 1, wherein said asynchronous control instructions are of the Hayes type.

3. A data transmission system as claimed in claim 1, wherein switching of said synchronous link to the open state occurs a brief interval following switching of said asynchronous link to the closed state, so that during said brief interval both links are in the closed state and thereby establish a time tolerance for enabling said first control means of said modem to prepare for reception of said asynchronous control instructions.

4. A bi-mode modem for use in a data transmission system wherein a data switch geographically remote from the modem selectively activates one of a pair of data transmission links, one of said links being for synchronous transmission and the other for asynchronous transmission; the asynchronous link being activated when asynchronous control instructions are to be transmitted via said data switch to said modem; said modem comprising:

a first interface circuit coupled to said synchronous link and a second interface circuit coupled to said asynchronous link; and control means for detecting the logic state of said links to determine which of said links is activated and controlling said interface circuits so that the modem operates via the second interface circuit when the asynchronous link is detected to be activated;

whereby when asynchronous control instruction are to be transmitted thereto, said modem operates via the asynchronous link.

\* \* \* \* \*